United States Patent

[11] 3,572,950

[72] Inventors Wilhelm Abeck; Wolfgang Eichler; Richard Menold, Leverkusen, Germany; Bernhard Seidel, Gruenwald, near Munich, Germany
[21] Appl. No. 759,435
[22] Filed Sept. 12, 1968
[45] Patented Mar. 30, 1971
[73] Assignee AGFA-Gervaert Aktiengesellschaft Leverkusen, Germany
[32] Priority Sept. 21, 1967
[33] Germany
[31] A56845

[54] PROCESS FOR DETERMINING THE MAGNETIC ORIENTATION IN MAGNETIC RECORDING MATERIALS
3 Claims, 5 Drawing Figs.

[52] U.S. Cl. ........................................................ 356/210
[51] Int. Cl. ........................................................ G01n 21/48
[50] Field of Search ............................................ 356/210, 209, 103, 213; 350/15, 14, 160

[56] References Cited

UNITED STATES PATENTS 2,788,702 4/1957 Baum, Jr. ...................... 356/103
3,310,680 3/1967 Hasegawa...................... 356/104

*Primary Examiner*—Ronald L. Wibert
*Assistant Examiner*—Conrad Clark
*Attorney*—Connolly and Hutz

ABSTRACT: Process for the measurement of the orientation of magnetizable particles in magnetic recording materials by determining the intensity of the scattered radiation obtained from incident beams of electromagnetic waves at the angle of scatter $\gamma'$ as a function of the angle of rotation $\Phi$, whereby the measurement is carried out in such a manner that the plane of scatter is perpendicular to the surface of the recording material, i.e.: the incident light beam, the normal to the surface and the scattered light beam lie in one plane.

Patented March 30, 1971 3,572,950

3 Sheets-Sheet 1

Figure 1:
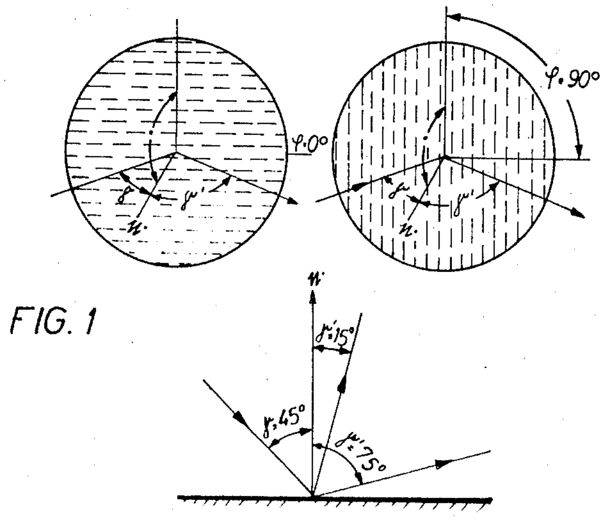

INVENTORS:
WILHELM ABECK, WOLFGANG EICHLER, RICHARD MENOLD, BERNHARD SEIDEL.

BY

INVENTORS:
WILHELM ABECK, WOLFGANG EICHLER, RICHARD MENOLD, BERNHARD SEIDEL.
BY

Patented March 30, 1971 3,572,950

INVENTORS:
WILHELM ABECK, WOLFGANG EICHLER, RICHARD MENOLD, BERNHARD SEIDEL.
BY
Connolly and Hutz
their attorneys

PROCESS FOR DETERMINING THE MAGNETIC ORIENTATION IN MAGNETIC RECORDING MATERIALS

The invention relates to a process for determining the magnetic orientation in magnetic recording materials, in which the degree of orientation can be measured while the tapes are still being manufactured without magnetically influencing the coating.

Magnetic recording tapes used nowadays for recording sound or images generally contain a layer of binder with ferromagnetic particles dispersed therein which is applied to a support. The ferromagnetic material incorporated with the binder may, for example, be needle-shaped $\gamma$-ferric oxide particles. The length of these particles is between about $0.1\mu$ and $1\mu$ and their axial diameter is about $0.05\mu$ to $0.2\mu$.

The quality of reproduction obtained from a magnetic tape can be improved by applying a powerful external magnetic field during the production of the coating, immediately after casting and before drying of the coating. This leads to preferential directions of magnetization due to the alignment of the magnetic particles in the coating, which positively influence the quality of reproduction. Methods of measuring the preferential directions of magnetization in the coating and controlling these during the manufacturing process are of some interest. For control purposes, however, the measuring methods must be so designed that they will not influence the quality of the coating obtained.

Direct magnetic measurement of the *Br/Bs* value on a continuous magnetic tape of about 1 to 2 m. in width would give rise to considerable difficulties. The production of the saturation field and simultaneous measurement of *Bs* would alone involve considerable difficulties, quite apart from the problems of guiding the tape and erasing it.

Up until now it has been the practice simply to cut out portions of the final tape and determine the *Br/Bs* values on these samples. This was done by placing the samples into a magnetic foil and applying a magnetic field along the direction which was presumed to be the preferential direction of magnetization, and the hysteresis loop of magnetic induction was measured. The quotient of remanence and saturation value (here termed *Br/Bs*) is a measure of the preferential direction of magnetization. The higher the quotient (compared with the unoriented tape), the more strongly marked is the preferential direction of magnetization (maximum value=1). A further possibility for checking consists in playing the finished tape to test the quality of reproduction.

In both cases, the testing of the coating is carried out only on the finished tape. The manufacturing process cannot thereby be controlled, so that faulty coatings cannot be avoided.

It is the object of this invention to develop a process for the measurement of magnetic orientation, by means of which the degree of orientation can be measured during manufacture of the tapes.

It has now been found that the magnetic orientation can be determined optically by measuring the intensity of the scattered radiation obtained from incident beams of electromagnetic waves, for example those from the visible region of the spectrum, as a function of the angle of rotation $\Phi$. The process according to the invention is based on the discovery that the preferential direction of magnetization imparted to the magnetizable particles, which may be individual particles or agglomerates, affects the surface structure of the coating and thereby alters the optical response of the magnetizable coatings.

Figure 3:
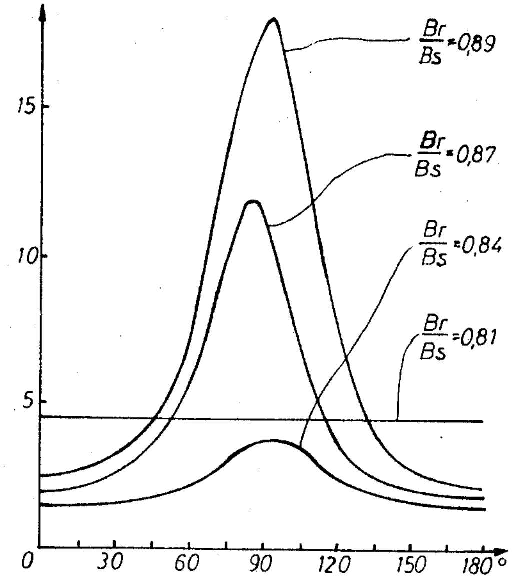
Figure 4:
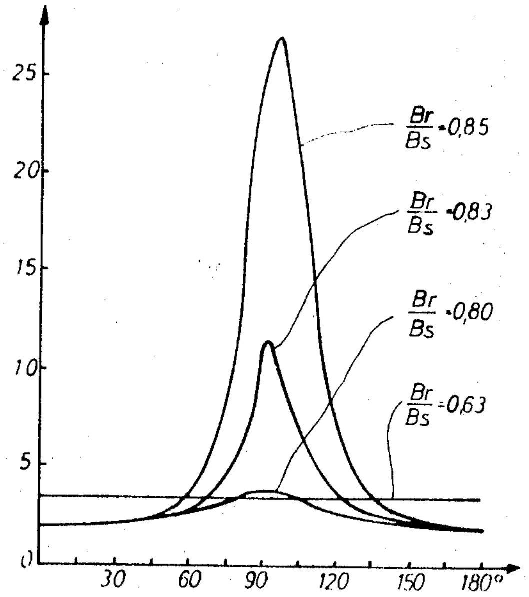
Figure 5:
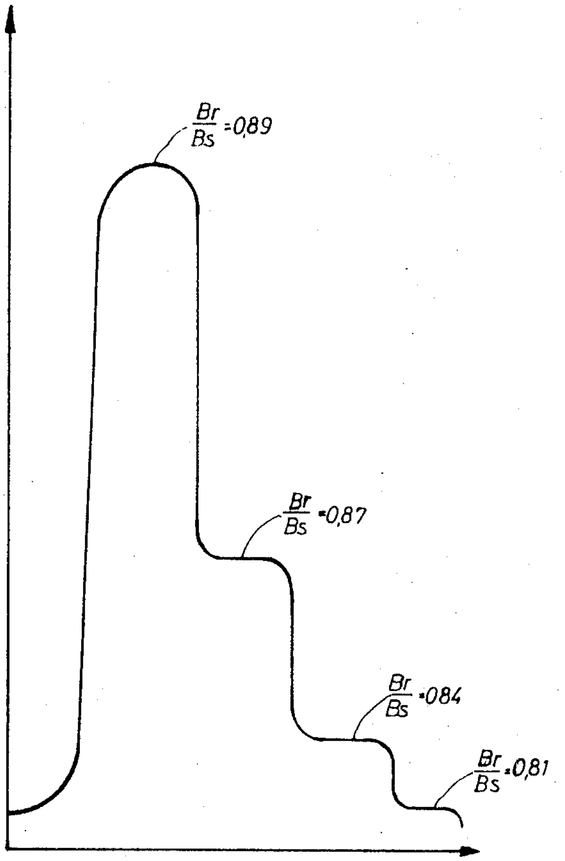

The invention is more fully explained with reference to the accompanying drawings. FIG. 1 illustrates the principle of the process according to the invention. FIGS. 3 to 5 show measuring curves such as those which are obtained by the process according to the invention, the intensity of the scattered light of axis of ordinates being plotted against the angle of rotation as axis of abscissae.

As shown in FIG. 1, according to the process of the invention a beam of light is directed at an angle of incidence $\gamma$ onto the surface of a magnetic tape. The intensity of the scattered light is measured at an angle $\gamma'$ which is different from $\gamma$. The measurement is advantageously carried out in such a manner that the plane of scatter is perpendicular to the surface of the coating, i.e. the incident light beam which is perpendicular to the coating and the scattered light beam lie in one plane. The direction of incidence of the light relative to the preferential direction of magnetization of the coating is altered by rotation of the coating, the perpendicular to the coating acting as the axis of rotation. The light source and the measuring shutter (receiver) remain at rest. The intensity of the scattered light at the angle of scatter $\gamma'$ is recorded as a function of the angle of rotation $\Phi$. The angle of rotation is 90° if the plane of scatter and the preferential direction of magnetization of the coating are perpendicular to each other. The angle of rotation is 0° if the preferential direction lies in the plane of scatter.

Figure 2:
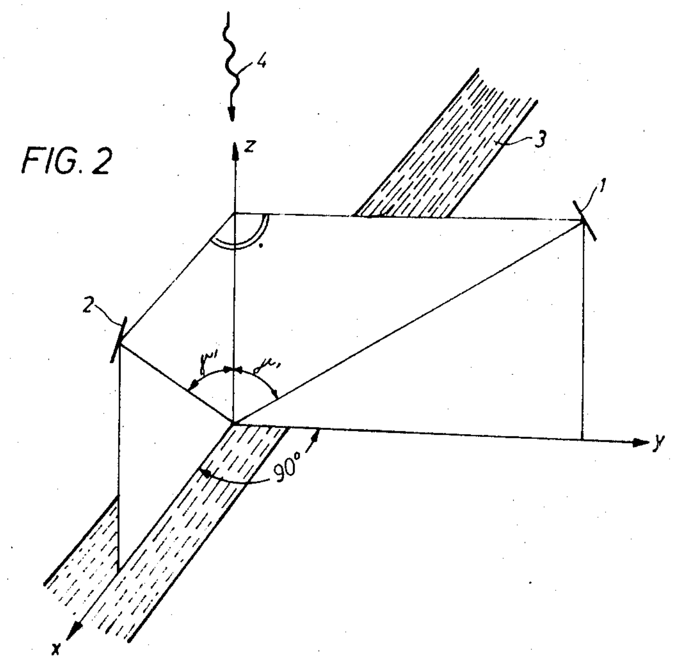

The principle of an apparatus for checking magnetic tapes by the process according to the invention is shown in FIG. 2. The almost parallel focused light 4 from a stabilized light source is directed perpendicularly onto the surface of a tape 3. The intensity of the scattered light is measured at a scatter angle $\gamma'$ of 60° by means of two photoelectric elements 1 and 2 which are at 90° to each other. The photoelectric elements are so arranged in relation to the preferential direction of magnetization of the tape that one photoelectric element measures the scatter light at the angle of rotation $\Phi$=0° (2) and the other at the angle of rotation $\Phi$=90° (1). *x*, *y* and *z* represent a three-dimensional rectangular coordinate system to show the planes of scatter.

If continuous measurement is carried out on moving tapes, the usual guide elements for the tape are necessary. The measuring apparatus must, of course, be shielded against interference from external sources of light.

Typical measuring curves which have been obtained with the arrangement described are shown in FIGS. 3 to 5. The intensity of the scattered light (n relative units) is plotted there as a function of the angle of rotation. In the coatings which have not been oriented in the magnetic field (coatings without preferential direction of magnetization), the intensity of the scattered light is independent of the angle of rotation, i.e. there is also no optical preferential direction. The intensity of scatter in oriented coatings (coatings with a preferential direction of magnetization), in contrast, passes through a maximum at 90°. The intensity of scatter is least at 0° and 180°, i.e. an optical preferential direction is shown in the case of oriented coatings.

The curves also show that there is a direct relationship between the magnetic orientation properties (expressed as the *Br/Bs* value) and the intensity of scatter as a function of the angle of rotation in a system.

Quite generally, the more marked the preferential direction of magnetization of a coating (expressed as the *Br/Bs* value), the more the relative height of the scatter maxima increases. This means that, in a system, the relative height of the scatter maximum can be used to control the magnetic orientation of the coating.

The process according to the invention indicates with a high degree of sensitivity every change in the alignment of the magnetizable particles. The process is eminently suitable for defect-free, continuous and quantitative controlling of magnetizable tapes during the manufacturing process. The process enables measurements to be carried out not only on dry but also on areas of the coating during casting which are still moist, as soon as a surface structure has formed. It is thus possible to check whether any faults occurring during the drying process are still present after passage through the external magnetic field.

In practice, it is not necessary to measure the intensity of the scattered light as a function of all the angles between 0° and 360°; it is sufficient to measure the intensity of scatter under certain angles of scatter. This can be done by directing two beams of light at the same angle onto the coating when the freshly cast coating on the moving tape has passed through the orientating magnetic field. One light beam enters the tape in a plane which is determined by the preferential direction of the coating and is perpendicular to the coating (corresponding to the angle of rotation $\Phi=0$); the other beam lies in a plane perpendicular to the first (corresponding to an angle of rotation $\varphi=90°$). The intensity of the scatter light of the two beams is measured separately at a given angle $\gamma'$. Fluctuations in the differences between the intensities of the scattered light, which are preferably transmitted to a recording instrument, indicate alterations in the structure of the coating.

It is also sufficient to let a beam of light fall perpendicularly onto the coating and to measure the scattered light at the angle $\Phi=0$ and the angle $\Phi=90°$ by means of two receiver cells. FIG. 5 shows curves obtained by a measurement carried out as described above. A magnetizable tape which had been produced by joining together four different magnetizable coatings with different orientations but of the same composition as regards the magnetizable pigment and binder was used for the measurement. A light beam ($\lambda=1\mu$) falls on the moving tape (3 m/min) normal to the surface of the coating. The scattered light falls on two photoelectric cells which are so arranged that they correspond to a scatter angle of 60° and angles of rotation of $\Phi=0°$ (minimum and $\Phi=90°$ maximum). The difference in the intensities of the scattered light measured by the two cells is transmitted to a recording instrument and registered there. The values obtained show that the difference in intensity increases with an increasing *Br/Bs* value of the tape.

If the beam of light is incident perpendicularly, it is particularly easy, using a given scatter angle, to obtain intensity values of the scattered light for several angles of rotation by arranging several receivers in a circle round the incident beam.

In the process according to the invention, the difference in intensity at the values $\Phi=0°$ and $\Phi=90°$ is a measure of the preferential direction of magnetization and the quotient of these two intensities is also a measure of the preferential direction of magnetization.

EXAMPLE 1

In three solutions of 17.2 g. of a polyester (made from 3 mols of adipic acid, 2 mols of 1,3-butylene glycol and 2 mols of hexane triol) in 253 g. of ethyl acetate, 70 g. of butyl acetate and 21 g. of cyclohexanone, 171 g. of needleshaped $\gamma$-ferric oxide particles (particle length $0.7\mu$, particle width $0.1\mu$) are ground in a ball mill with glass balls for 24 hours. After the addition of 24 hexamethylene diisocyanate which has been partly reacted with hexanetriol, the resulting suspension is applied to a polyester foil $25\mu$ in thickness (based on terephthalic acid and ethylene glycol).

Three parallel experiments are carried out with this suspension, variation in the degree of orientation being achieved by applying the orienting magnetic field after different preliminary drying times of the coating. Before the coatings set, they are passed through a homogeneous magnetic field of field strength 1,000 Oerstedt.

The scatter curves obtained by measuring the degree of orientation according to the invention are shown in FIG. 4. Both absolute and the relative heights of the scatter maxima increase with increasing *Br/Bs* value.

The *Br/Bs* values are obtained from the scatter curves by means of a calibrating curve which has been obtained from magnetic measurements of this value by conventional methods on the same tape.

The results are given in the following table 1.

Table 1

| Preliminary drying time in seconds: | Measured Br/Bs value, A |
|---|---|
| | [1] 0.63 |
| 24 | 0.80 |
| 21 | 0.84 |
| 18 | 0.85 |

[1] Unoriented coating.

EXAMPLE E2

171 g. of cubic ferric oxide are used in the binder solution according to Example 1 by the method given there.

Three parallel experiments are carried out with this suspension, variation of the degree of orientation being achieved by applying the orienting magnetic field after different preliminary drying times of the coating.

As described in Example 1 the process according to the invention is carried out during production of the tape, and the degree of orientation is measured by conventional processes on the finished tape.

The results are summarized in the following Table 2.

Table 2

| Preliminary drying time in seconds: | Measured Br/Bs value, A |
|---|---|
| | [1] 0.81 |
| 24 | 0.84 |
| 21 | 0.87 |
| 18 | 0.89 |

[1] Unoriented coating.

We claim:

1. A process for optical determining by light scattering on the surface of a magnetic recording material the degree of orientation of magnetizable particles in the material which has at least one magnetizable coating with a nonmagnetic binder in which magnetizable particles are dispersed, said process being characterized in that a beam of electromagnetic waves is directed onto the surface of the magnetic recording material and the intensity of the scattered radiation of the angle of scatter $\gamma'$ is measured as a function of the angle of rotation $\Phi$, and whereby the axis of rotation is perpendicular to the material being measured.

2. The process of claim 1, wherein two electromagnetic beams at the same angle $\gamma'$, are directed onto the surface of the material and magnetizable coating and the intensity of the scattered radiation is measured at two angles of rotation.

3. The process of claim 1, wherein one electromagnetic beam is perpendicularly directed onto the surface of the material and the intensity of the scattered radiation is measured at least two angles of rotation $\Phi$.